United States Patent [19]
Lukasiewicz

[11] Patent Number: 5,244,211
[45] Date of Patent: Sep. 14, 1993

[54] GOLF CLUB AND METHOD OF MANUFACTURE

[75] Inventor: Robert F. Lukasiewicz, Hinsdale, Ill.

[73] Assignee: Ram Golf Corporation, Melrose Park, Ill.

[21] Appl. No.: 864,582

[22] Filed: Apr. 7, 1992

[51] Int. Cl.⁵ .................... A63B 53/04; B29D 9/00
[52] U.S. Cl. ...................... 273/167 R; 273/167 H; 273/DIG. 8; 264/45.4; 264/46.6
[58] Field of Search ........................ 273/167–175, 273/DIG. 8, 78, 77 R; 264/45.4, 45.6

[56] References Cited

U.S. PATENT DOCUMENTS

| | | | |
|---|---|---|---|
| 4,123,061 | 10/1978 | Dusbiber | 273/DIG. 8 X |
| 4,438,931 | 3/1984 | Motomiya | 273/167 H |
| 4,516,778 | 5/1985 | Cleveland | 273/167 H |
| 4,553,755 | 11/1985 | Yamada | 273/171 |
| 4,714,577 | 12/1987 | Nagamoto et al. | 273/167 H |
| 4,783,853 | 11/1988 | Zuber | 2/2 |
| 4,803,023 | 2/1989 | Enomoto et al. | 273/167 H |
| 4,824,116 | 4/1989 | Nagamoto et al. | 273/171 |
| 5,093,379 | 3/1992 | Tiao et al. | 36/114 X |

Primary Examiner—V. Millin
Assistant Examiner—Sebastiano Psassaniti
Attorney, Agent, or Firm—James P. Ryther

[57] ABSTRACT

A golf club comprising an elongated shaft with a lower end for attachment of the club head. The club head comprises a hosel portion for connection of the head to the shaft end, and a main body portion which comprises an enclosed outer wall and a hollow interior chamber. The club further involves the presence of molded material which fills the hollow chamber of the head, this molded material comprising a flexible synthetic plastic foam which bonds to the inner wall surfaces. The manufacturing method involves the filling of the chamber with the foam whereby the foam forms within the chamber. This method may involve the mixing of an aromatic isocyanate with a polyether polyol prior to introduction of the mixture into the chamber. The mixture, which forms a flexible polyurethane foam with the desired bonding characteristics, may be introduced through an axial bore defined by the hosel which opens into the interior of the chamber. The method is preferably applied to the manufacture of metal club heads.

10 Claims, 1 Drawing Sheet

GOLF CLUB AND METHOD OF MANUFACTURE

BACKGROUND OF THE INVENTION

This invention relates to golf clubs and to a method for manufacturing such clubs. The invention is particularly applicable to golf clubs which comprise a head with an associated hosel for connecting the golf club shaft to the head. The invention is further limited to use in connection with heads which have hollow interiors, such heads usually being made of metal or some other non-wood material.

Metal heads have become extremely popular for use in the manufacture of golf clubs, particularly clubs used for longer shots, including the driver and other "woods". These metal club heads typically have at least some hollow portions which keep the heads relatively light-weight. Design techniques, specifically casting techniques, have become sufficiently precise so that such metal heads may be substantially completely hollow although the invention is also applicable to heads which include interior strengthening walls or ribs of some sort.

One problem encountered with a hollow metal head is that a ringing or clanking sound will occur when a ball is struck. In order to overcome this problem, the practice has been to fill the head with a plastic foam so that the sound at impact would be deadened and more like the "solid" sound of a club head made of wood. Thompson Patent No. 4,319,752, Hayashi et al Patent No. 4,451,041, Schmidt Patent No. 4,511,145, Ezaki Patent No. 4,874,171 and Shiotani et al Patent No. 4,988,104 all provide examples of such foam-filled heads.

As set forth, for example in the Ezaki et al disclosure, a rigid urethane foam has been used as a preferred material for filling the interior of a metal golf club head. This foam will achieve the desired results from the standpoint of a sound developed when a ball is struck. It has been found, however, that during use of a club with such rigid foam, there is a tendency for the rigid foam to move relative to the inner walls of the club head. Eventually, this will create a rattling sound, particularly as the relative movement causes a breakdown of the material. This is distracting and also gives the impression of a defective club. Eventually, at least parts of the foam may also turn to powder after continued use so that the sound-deadening function can be lost or at least diminished. The Hayashi patent disclosure teaches the use of pins which penetrate the foam with a view toward positioning and retaining the material and thereby alleviating this problem.

SUMMARY OF THE INVENTION

This invention relates to an improved golf club head, preferably a metal golf club head of the type used for a driver or other "woods" in a set of golf clubs. Although the invention will be described with reference to such clubs intended for hitting longer shots, it will be understood that the invention is generally applicable to any golf clubs having hollow-head portions.

Golf clubs of the type contemplated by this invention comprise the standard elongated shaft with a lower end for attachment of a golf club head. The golf club head includes a hosel portion which is used for connecting the head to the lower end of the shaft, and a main body portion comprised of an enclosed outer wall defining a hollow interior chamber.

The manufacture of a golf club of the invention provides for the filling of the hollow chamber with molded material comprising a flexible synthetic plastic foam material, such as a controlled formulation of polyurethane foam which will achieve the benefits of the invention. This foam is preferably formed from a mixture of controlled amounts of an aromatic isocyanate and a polyether polyol. The desired properties from the standpoint of flexibility are achieved when 25–40 parts of the isocyanate are mixed with 60–75 parts of the polyol. The best results are achieved with a one to about two ratio of these ingredients.

The achievement of flexibility avoids break-up of the foam during use of the club. Thus, the high impact forces encountered during use are apparently sufficiently absorbed without reaching fracture levels as far as the foam material is concerned.

An additional surprising benefit of the use of flexible foam in accordance with this invention, is the fact that the foam will adhere to the inner walls of a club head thereby eliminating any tendency toward relative movement during use of the club. This also contributes to the avoidance of stresses sufficient to cause break-up of the foam and loss of the benefits achieved with the foam.

The manufacturing procedure for a golf club of the type contemplated by the invention typically involves the formation of a mixture of ingredients for producing a flexible foam just prior to introduction of the mixture into the hollow interior chamber of the club head.

In a typical operation, isocyanate and polyol ingredients are mixed in the desired ratio and then this liquid mixture is pumped into the club head interior. The mixture may be heated, for example, in the order of temperatures of 90° F., and the mold may also be maintained at about this temperature. In a matter of several minutes, the mixture will develop into a foam.

In order to permit venting of air during foam formation, it is preferred that the mixture be introduced through the passage formed by the club hosel with this passage opening into the club head interior. As the foam is formed, venting is permitted, and foam will usually fill the hosel passage when the foaming is complete. It is preferred that this foam then be removed prior to connection of the shaft to the club head.

DETAILED DESCRIPTION OF THE INVENTION

Figure 2:
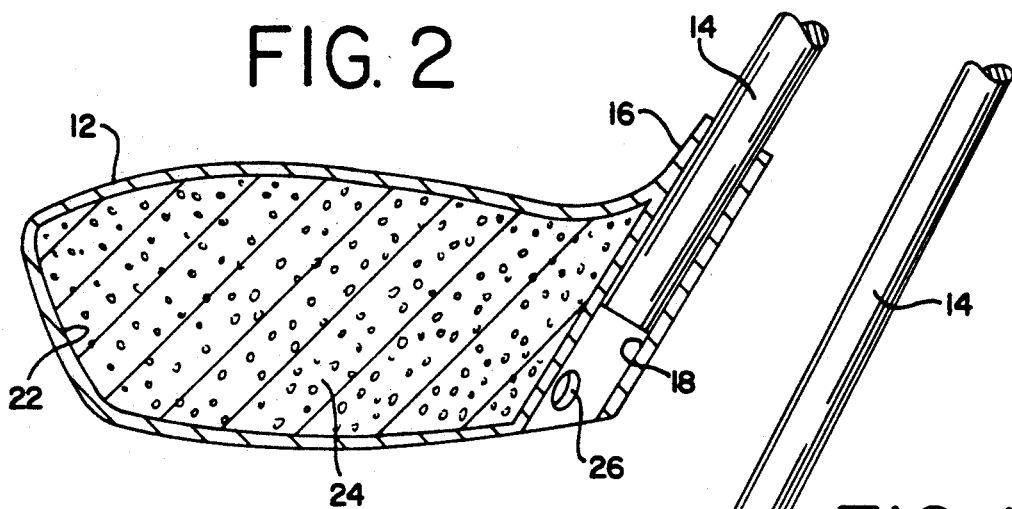
FIG. 2 is vertical sectional view taken about the line 2—2 of FIG. 1 which illustrates foam formation in the club head; and, FIG. 3 is a cross-sectional view illustrating the configuration of the hosel in its relationship with the club shaft and head.
Figure 1:
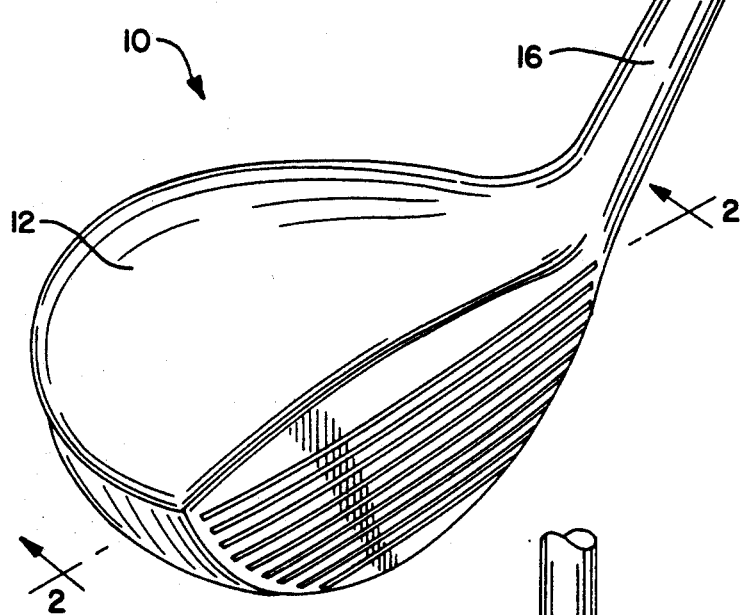
FIG. 1 is a perspective view of a typical golf club head and shaft.
Figure 3:
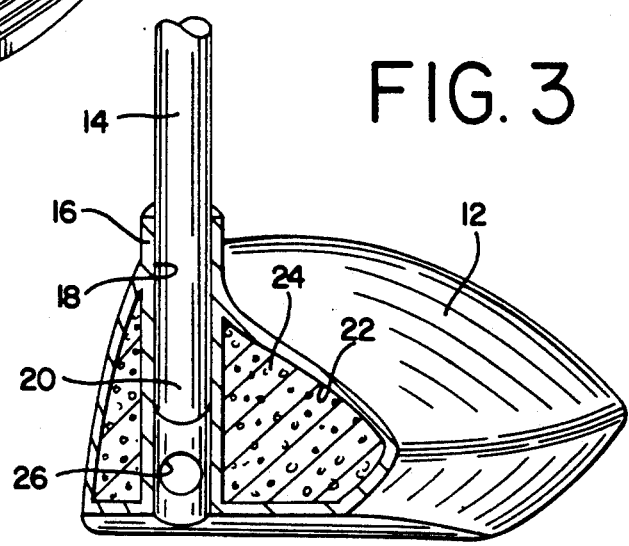

The invention is applicable to a golf club 10 comprised of club head 12 and shaft 14. As previously discussed, this club head will typically be formed of metal which is cast to form an outer shell and a hollow interior. The concepts of the invention are, however, applicable to hollow club heads made of other materials.

The drawings illustrate a "wood" type of golf club 10 used for hitting longer shots. It will be understood that the invention is applicable to all types of golf clubs which include a hollow interior which is intended to be filled with light-weight plastic.

As shown in the drawings, the club head 12 includes a hosel 16 which defines a bore 18 for receiving the lower end 20 of the shaft 14. Various other hosel designs as well as various other means for securing a shaft in position relative to a club head are contemplated for application of the concepts of the invention.

The hollow head 12 defines an inner wall surface 22. Flexible synthetic foam material 24 fills the chamber defined by the inner wall surface. A port hole 26 defined by the hosel serves to communicate the chamber of the golf club head with the hosel bore.

In the manufacture of clubs of the type illustrated, a combination of ingredients is typically prepared and then introduced under pressure through a nozzle. For example, an aromatic isocyanate component comprising Bayfit U-562-A manufactured by Mobay Chemical is provided in one drum. A polether polyol component comprising Bayfit U-562-B is provided in a separate drum.

Through the use of standard pumping equipment, the material from the respective drums is mixed in a mixing chamber, and then introduced through a nozzle into the bore 18 and through port hole 26. Preferably the club is located with the toe of the club pointed slightly downwardly which allows the expanding foam to rise from the toe and up towards the bore. Thus, the foaming action occurs as soon as the mixture is relieved from pressure after introduction into the club head chamber, and air is allowed to escape through the port hole until the chamber is completely filled.

Preferably an operator will be present to prevent excess foam from spilling over onto the exterior of the finished club. The operator may for example, insert a slotted plug into the top of the bore to prevent excessive overflow but still allowing for some venting through the slot.

After completion of the foaming action, the bore will be reamed to permit assembly with the shaft 14. A plug will also be inserted at the bottom of the bore either prior to introduction of the mixture or, if the end of the bore is otherwise closed during formation of the foam, the plug will be inserted after completion of the reaming operation.

Heating means may be employed for heating the ingredients to be mixed prior to introduction into the mixing chamber and/or the ingredients may be heated while in the mixing chamber, and/or the mold may be heated. Temperatures in the order of 75°-115° F. are recommended for material and mold temperatures by the manufacturer of the Bayfit chemicals. It will be understood that equivalent chemicals are contemplated for use in accordance with this invention.

The Bayfit chemicals referred to, as well as equivalent ingredients, are used to form a mixture comprising from 25-40 parts of an aromatic isocyanate and from 60-75 parts of a polyether polyol. The preferred composition comprises one part of the isocyanate mixed with about two parts of the polyol.

The combination described provides a flexible synthetic plastic foam within the golf club head chamber which eliminates or at least minimizes problems encountered with the rigid plastic foams of the prior art. It has also been found that the formulation of the invention will automatically adhere to the inside wall surfaces of the club head chamber thereby enhancing the performance and durability of the combination.

The Bayfit 562 chemicals which comprise the preferred form of the invention have the additional features of excellent flow characteristics and other advantages which are all achieved without the use of a chlorofluorocarbon blowing agent. Accordingly, more suitable working conditions and an environmentally satisfactory process are involved.

It will be understood that various changes and modifications may be made in the above-described invention without departing from the spirit of the invention particularly as defined in the following claims.

I claim:

1. A golf club comprising an elongated shaft having a lower end, a head for the club, said club head comprising a hosel portion for connection of the head to said lower end, and a main body portion comprising an enclosed outer wall and an inner wall defining a hollow interior chamber, and molded material filling said chamber, said molded material comprising a flexible synthetic plastic foam adhering to said inner wall, said foam comprising flexible polyurethane foam formed from a mixture of 25 to 40 parts of an aromatic isocyanate and 60 to 75 parts of a polyether polyol.

2. A golf club according to claim 1 wherein one part of the isocyanate is mixed a with about two parts of the polyol.

3. A method for producing a golf club of the type comprising an elongated shaft having a lower end, and a head for the club, aid club head comprising a hosel portion for connecting the club to said lower end of the shaft, and a main body portion comprising an enclosed outer wall and an inner wall defining a hollow interior chamber, said method comprising the steps of filling said chamber with a flexible synthetic plastic foam, said foam adhering to said inner wall, producing said foam by forming a mixture of ingredients comprising from 25 to 40 parts of an aromatic isocyanate and from 60 to 75 parts of a polyether polyol, and introducing the mixture into said chamber whereby said flexible foam forms within the chamber.

4. A method in accordance with claim 3 wherein one part of the isocyanate is mixed with about two parts of the polyol.

5. A method in accordance with claim 3 including the step of heating said ingredients prior to introduction of the mixture into the chamber.

6. A method in accordance with claim 5 including the steps of introducing the mixture, maintaining an opening to the exterior of the chamber to permit venting of air as the foam forms, and closing said opening after the foam fills said chamber.

7. A method according to claim 6 wherein said hosel defines an axial bore, an opening defined by the hosel providing communication between said chamber and said bore, and wherein said mixture is introduced through said bore and enters said chamber through said opening.

8. A method according to claim 7 wherein the foam fills said bore in the process of foam formation, and including the step of removing the foam which formed in the bore prior to connection of the head to the shaft.

9. A golf club according to any of claims 1 or 2 wherein said head is formed of metal.

10. A method according to any of claims 3 or 4 wherein said head is formed of metal.

* * * * *